April 15, 1947.　　C. A. CHALFANT ET AL　　2,419,117
AERO-ELECTRIC VALVE
Filed Dec. 5, 1944　　2 Sheets-Sheet 2
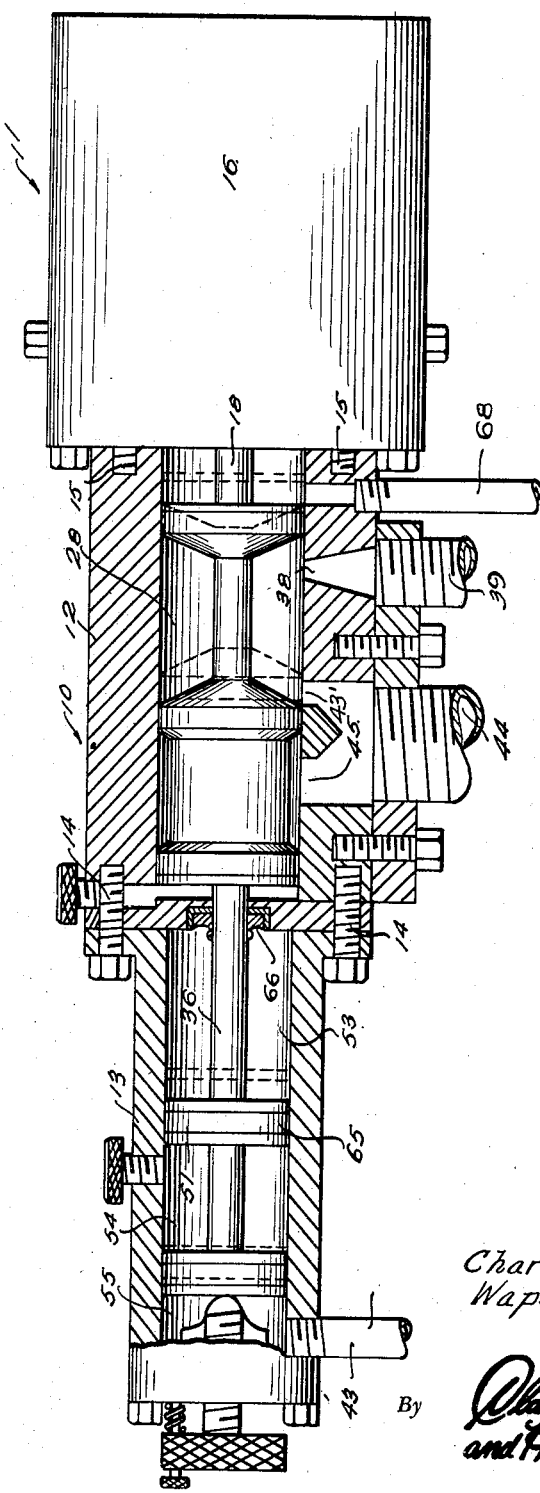
Inventor
Charles A. Chalfant, &
Waple Langston,
By
Clarence A. O'Brien
and Harvey B. Jacobson
Attorneys Patented Apr. 15, 1947

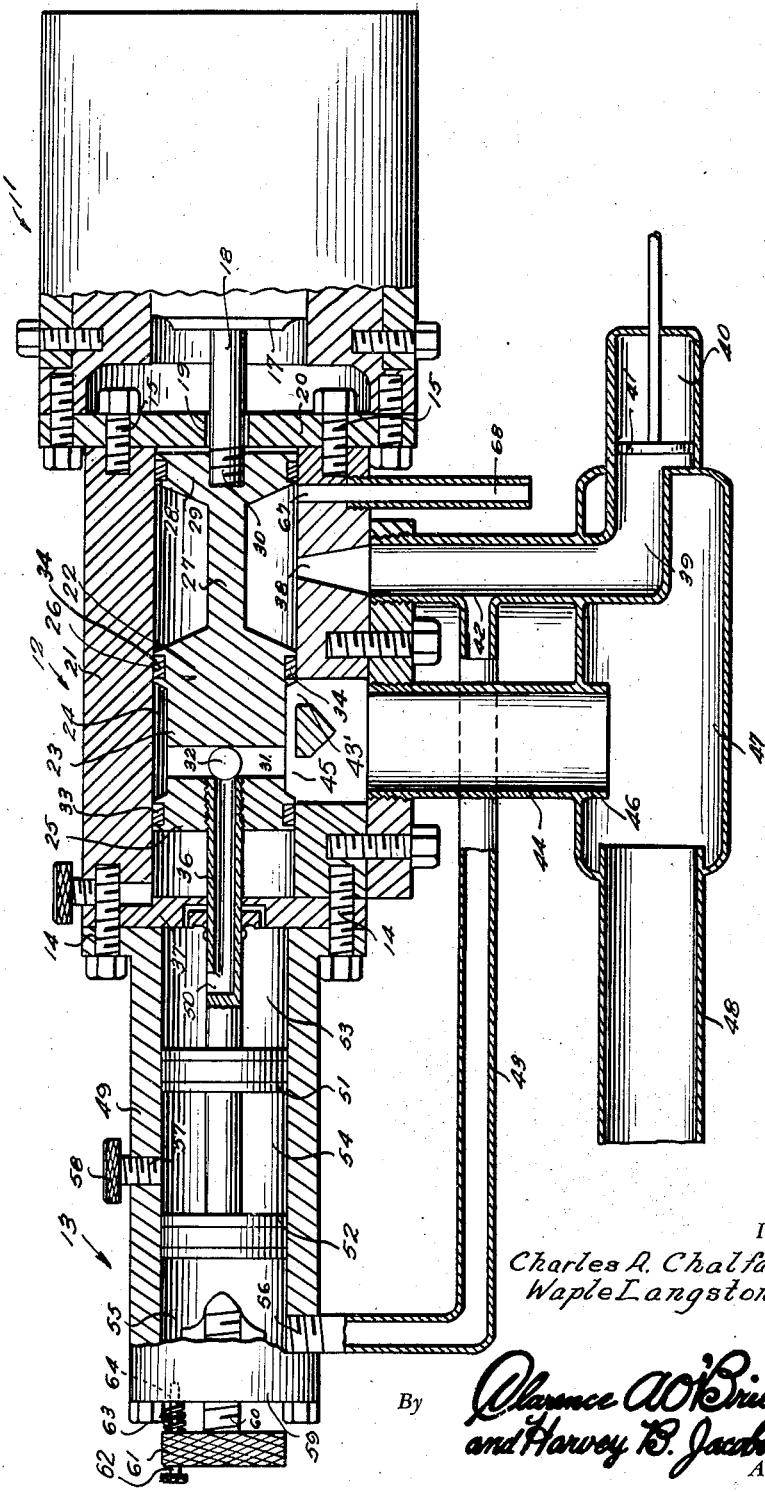

2,419,117

UNITED STATES PATENT OFFICE 2,419,117

AEROELECTRIC VALVE

Charles A. Chalfant and Waple Langston,
Pine Bluff, Ark.

Application December 5, 1944, Serial No. 566,735

4 Claims. (Cl. 303—20)

This invention relates to a valve structure especially adaptable for use in railroad rolling stock and has for its object to provide a combined air and electrically operated valve.

Another object of the invention is to provide an electrically controlled valve adapted for use in air braking systems as used on railway rolling stock.

Another object of the invention is to provide in an air brake system an electrically operated valve through which the functioning of the air system is controlled.

A further and important object of the invention is that our electric control system brakes will be as quickly set at the rear of a long train as at its forward end due to the instant action of electricity as compared with the much slower action in a purely air system, whereby possibility of telescoping and bumping of cars will be eliminated, thus providing a much safer system of braking or slowing of a train.

Other features and advantages will become more readily apparent from the following description and the accompanying illustrative drawings in which:

Figure 1 is a longitudinal sectional view of an air valve, and

Figure 2 is a sectional elevation thereof.

Similar characters of reference indicate similar parts throughout the specification which follows and in the views in the accompanying drawings and in which 10 indicates our valve as a whole which comprises three separate sections 11, 12, and 13, which are connected together by bolts 14 and 15 to form a single unit. We will specify the construction of each of these units separately and then explain their cooperating function.

Section 11 of the device comprises a casing 16 for an electro-magnet 17, to the core of which is secured a connecting rod 18, which operates through a bore 19, in the end wall 20, of the case 16. The latter case 16 is secured to a cylinder 21, within which is slidably seated a spool valve 22, having a reduced diameter at 23, forming an annular chamber 24, between the end and center 25 and 26 of the spool. The spool is again reduced to a much greater extent as at 27, to provide a relatively larger annular chamber 28, between said portion 26 and the end 29. Into this latter end the threaded terminal 30 of the rod 18 is threaded, whereby said rod and the armature of the electro-magnet must move together.

The body of the spool valve 22 is provided with bores 31 and 32, extending transversely therethrough and at right angles to one another and which lead into the chamber 24, which is sealed from chamber 28, by rings 33 and 34, surrounding the enlarged peripheral portions 25 and 26 of the spool. Screw-threaded into the end 35 of the spool is a tubular stem 36, projecting through the wall 37, attached to the cylinder 25, by said screws 14, which tube opens into the said bores 31 and 32.

A port 38 connects chamber 28 with a pipe 39, which leads into a cylinder 40, within which operates a piston 41. The pipe 39 also opens at 42 into a pipe 43, of reduced diameter, which latter pipe connects with section 13, and will be referred to later. A much larger pipe 44 connects through a relatively large port 45, which opens into the smaller chamber 24. The other end 46, of pipe 44, connects with a reservoir 47, which is connected with the pipeline 48, of a train air brake system.

Now referring to section 13 of the valve mechanism, it consists of a cylinder 49, of smaller diameter than cylinder 21, and is connected by said stem 36 therewith, through a port 50. The stem 36 forms a piston rod for the two spaced apart pistons 51 and 52 fixed thereon, whereby three separated chambers 53, 54, and 55, are provided in the cylinder 49, the latter chamber having a port 56, leading into pipe 43. The chamber 54 is provided with a vent 57, in the form of a tubular screw provided with a strainer. Threaded through the head or end wall 59, of the cylinder 49, is an adjustment screw 60, for limiting the movement in one direction of the piston rod or stem 36. Projecting through the head 61, of the screw 60, is a load adjuster lock key 62, around which is coiled a spring 63, for forcing its end (not shown) into one of a series of annularly disposed bores 64, (shown dotted) in said cylinder head 59.

Section 13 of the valve structure employs air pressure for its function, section 11 employs an electro-magnet for its function, while section 12 is operated through the functioning of the two sections 11 and 13. Equalization at either end of the spool valve 22 is the basis of the operation of our device. Assume that the electro-magnet in section 11 is constructed so as to provide a one-hundred-and-ten-lbs. pull when magnetized, and that actuating chamber 53 is charged with ninety pounds air pressure from the reservoir 47, through supply pipe 44, port 45, bores 31 and 32, stem 36, and port 50. Since the pull of the magnet exceeds that of the ninety pound air pressure in chamber 53, and as the members 18, 22 and 36 are fixedly connected, each will be retained in the extreme right side of their respective chambers, which is brake release position.

Air for the reservoir 47 is supplied by the train line 48, and therefore is constant. Chamber 53 is made airtight by the ring 65, on piston 51, and the leather pressure gasket 66. When the device is in release position the brake cylinder 40 is connected to atmosphere through the brake cylinder pipe 39, port 38, valve chamber 28, port 67, and release pipe 68. Also chamber 55 is connected to atmosphere through pipes 43, 39, etc. The system is now properly charged and ready for use and in normal position when the train is moving over the road.

When it is desired to slow down or stop the train, the engineer causes the device to supply air pressure to the brake cylinder 40, by reducing voltage to the electro-magnet to any desired point, through means of a voltage control (not shown). When the pull of the magnet falls below the pressure of air in chamber 53, said pressure will force piston 51 to its extreme left position, which action will move all of the members 52, 36, 22 and 18 to said left position, in which position the brakes are applied. The movement of this element toward the brake application position is governed by the screw 60.

The purpose of controlling the movement of the valve is to regulate the distance the plunger must move back to contact the stationary portion of the magnet armature so as to further weaken the magnet when desired. The magnet is further weakened when the movement of the valve is increased because the distance between the plunger and stationary portion of the magnet armature is made greater, thereby causing a longer air gap. This will cause more air pressure to accumulate in the brake cylinder of that particular car, since more air pressure must be exerted on the pressure control piston to offset the weakened magnet.

With the device in the "application" position, the reservoir 47 is opened to the cylinder 40, through pipe 44, port 43', chamber 28, port 38, and pipe 39. Chamber 55 is connected to the pipe 39 by pipe 43, whereby the same pressure accumulates in chamber 55, as in cylinder 40; and the chamber 28 is disconnected from atmosphere, through the position of the end 29, of spool valve 22. The chamber 53 is still open to the reservoir 47. Air pressure will now flow from the reservoir into cylinder 40 and chamber 55, until the force exerted on pressure control piston 52 and the pull of the magnet become greater than that of the air pressure on the piston 51, which will reverse the action and bring the elements of the device to release position and bring the elements of the device to "lap" position.

When the ring 34 on the spool valve becomes line in line with the inside edge of port 45, in this reverse movement, air can no longer flow to chamber 55, therefore the valve will stop due to the equal force exerted on the actuating piston in chamber 53. The valve will maintain this position until a change is made at either end of the valve, either by the operator increasing or decreasing the current to the magnet or a leak of air from the other end, which causes the valve to move back to "application," restore the lost pressure, then return to "lap."

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described our invention that which we claim as new is:

1. In a brake system for railway cars a combined air and electrically controlled operating mechanism therefor, said mechanism including an electro-magnet, a rod operated thereby, a spool valve to which the rod is fixed, a piston rod, fixed to the spool, and a pair of spaced pistons fixed on the rod, all of said members operating in unison, separated cylinders enclosing the spool valve and the pistons, an air reservoir, a brake cylinder, both connected to said first cylinders, said reservoir also being open to a train brake air line, and said spool valve having means for controlling ports leading to said reservoir and brake cylinder.

2. In a brake system for railway cars a combined air and electrically controlled operating mechanism therefor, said mechanism including an electro-magnet, a rod operated thereby, a spool valve to which the rod is fixed, a piston rod fixed to the spool and a pair of spaced pistons fixed on the rod, all of said members operating in unison, separated cylinders enclosing the spool valve and the pistons, and an air reservoir, a brake cylinder, both connected to said first cylinders, said reservoir also being open to a train brake air line.

3. In a brake system for railway cars a combined air and electrically controlled operating mechanism therefor, said mechanism including an electro-magnet, a rod operated thereby, a spool valve to which the rod is fixed, a piston rod fixed to the spool and a pair of spaced pistons fixed on the rod, all of said members operating in unison, and separated cylinders enclosing the spool valve and the pistons.

4. In a brake system for railway cars a combined air and electrically controlled operating mechanism therefor, said mechanism including an electro-magnet, a rod operated thereby, a spool valve to which the rod is fixed, a piston rod fixed to the spool and a pair of spaced pistons fixed on the rod.

CHARLES A. CHALFANT.
WAPLE LANGSTON.

REFERENCES CITED

The following references are of record in the file of this patent:

UNITED STATES PATENTS

| Number | Name | Date |
| --- | --- | --- |
| 1,115,286 | Costelloe | Oct. 27, 1914 |
| 1,297,514 | Turner | Mar. 18, 1919 |
| 2,024,935 | Livingston | Dec. 17, 1935 |
| 2,336,887 | Piron | Dec. 14, 1943 |
| 828,939 | Kramer | Aug. 21, 1906 |